United States Patent
Lin et al.

(10) Patent No.: US 10,953,380 B1
(45) Date of Patent: Mar. 23, 2021

(54) CONTINUOUS PRODUCTION OF 2D INORGANIC COMPOUND PLATELETS

(71) Applicant: Nanotek Instruments, Inc., Dayton, OH (US)

(72) Inventors: Yi-jun Lin, Taoyuan (TW); Hsuan-Wen Lee, Taoyuan (TW); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 16/658,669

(22) Filed: Oct. 21, 2019

(51) Int. Cl.
| | |
|---|---|
| *B01J 19/18* | (2006.01) |
| *C01B 32/23* | (2017.01) |
| *C01B 32/225* | (2017.01) |

(52) U.S. Cl.
CPC ......... *B01J 19/1806* (2013.01); *C01B 32/225* (2017.08); *C01B 32/23* (2017.08); *C01B 2204/02* (2013.01); *C01B 2204/04* (2013.01)

(58) Field of Classification Search
CPC ......... C01B 17/20; C01B 19/00; C01B 19/04; C01B 13/40; C01B 25/00; C01B 25/003; C01B 25/02; C01B 2204/00; B01J 19/18; B01J 19/00; C22F 1/00; C22F 3/00
See application file for complete search history.

(56) References Cited

U.S. PATENT DOCUMENTS

| | | | | |
|---|---|---|---|---|
| 9,926,201 B1* | 3/2018 | Kessler | ............... | B29C 67/0011 |
| 10,351,430 B1* | 7/2019 | Kessler | ............... | C01B 32/174 |
| 2016/0009561 A1* | 1/2016 | Coleman | ............... | C01G 39/00 |
| | | | | 252/182.1 |
| 2018/0072947 A1* | 3/2018 | Pickett | ............... | C30B 33/00 |
| 2019/0152784 A1* | 5/2019 | Zhamu | ............... | C01B 32/23 |
| 2019/0336936 A1* | 11/2019 | Hong | ............... | B01J 19/1806 |

FOREIGN PATENT DOCUMENTS

| | | | | |
|---|---|---|---|---|
| WO | WO 2016175484 A1 * | 11/2016 | ............ | C01B 31/04 |
| WO | WO 2016208884 A1 * | 12/2016 | ............ | C01B 31/04 |

OTHER PUBLICATIONS

Liu et al., "Synthesis, anion exchange, and delamination of Co—Al layered double hydroxide: assembly of the exfoliated nanosheet/polyanion composite films and magneto-optical studies" J. Am. Chem. Soc. (2006) vol. 128, No. 14, pp. 4872-4880.

* cited by examiner

*Primary Examiner* — Timothy C Vanoy

(57) ABSTRACT

Provided is a process for manufacturing 2D inorganic compound platelets, the process comprising (a) preparing a first stock containing a 3D layered inorganic compound material dispersed in a liquid medium, (h) injecting the first stock into a continuous reactor having a vortex flow, (c) operating the continuous reactor to form a reaction product suspension containing 2D inorganic compound platelets dispersed in the liquid medium, and (d) separating and recovering said 2D inorganic compound platelets from said product suspension. The product suspension may be directed to flow back to the continuous director for further processing for at least another pass through the reactor, prior to step (d). The continuous reactor is preferably a Couette-Taylor reactor.

22 Claims, 1 Drawing Sheet

CONTINUOUS PRODUCTION OF 2D INORGANIC COMPOUND PLATELETS

FIELD

The present disclosure relates to a method and apparatus of producing two-dimensional (2D) inorganic compounds in mono-layer or few-layer platelet form. The method enables dramatically shortened time and significantly reduced amount of chemicals used to produce these 2D inorganic platelets.

BACKGROUND

Several layered inorganic materials can be reduced in thickness down to monolayers and their properties (e.g. typically non-conducting) are complementary to those of graphene (e.g. electrically conducting). Just like graphene from graphite, 2D inorganic material platelets, each comprising 1-10 layers of formula unit planes, can be produced by exfoliating and separating a bulk (3D) layered inorganic material. For examples, transition metal oxides (TMOs) and transition metal dichalcogenides (TMDs) have a layered structure. Atoms within each layer are held together by covalent bonds, while van der Waals forces hold the layers together. Layered materials (LMs) include a large number of systems with interesting properties. For instance, $NiTe_2$ and $VSe_2$ are semi-metals; $WS_2$, $WSe_2$, $MoS_2$, $MoSe_2$, $MoTe_2$, $TaS_2$, $RhTe_2$, $PdTe_2$ are semiconductors; h-BN (hexagonal BN), and $HfS_2$ are insulators; $NbS_2$, $NbSe_2$, $NbTe_2$, and $TaSe_2$ are superconductors; and $Bi_2Se_3$, $Bi_2Te_3$ show thermoelectric properties and may be topological insulators. Due to the weak bonding between the stacked layers, LMs can be used in lubricants. Further, LMs are also used as thermoelectric materials, in batteries, electrochemical, and photovoltaics (PV) cells, light emitting diodes, as ion exchangers, photocatalysts, etc. Similar to graphite and graphene, the properties of the resulting thin platelets are a function of the number of layers stacked together. For instance, although bulk $MoS_2$ has an indirect band gap, a monolayer of $MoS_2$ has a direct band gap that could be exploited for optoelectronics. This underscores the significance of developing the capability or ability to mass-produce ultra-thin 2D inorganic compound platelets having a narrow distribution of thicknesses or a uniform thickness.

Several methods have been proposed for making 2D inorganic material platelets, including mechanical cleavage, laser ablation, liquid phase exfoliation, thin film techniques (sputtering, evaporation, vapor phase epitaxy, liquid phase epitaxy, chemical vapor epitaxy, MBE, ALE, and plasma assisted deposition), electrochemical synthesis, and plasma etching, etc.

However, these processes still suffer from several drawbacks, including relatively low yield, low concentration of isolated mono-layer sheets, and the requirement of using multiple apparatus and/or an excessively large number of procedures. These shortcomings have prevented these processes from being adapted as a large-scale manufacturing process.

An urgent need exists for a production process and apparatus that require a shortened process time, less energy consumption, reduced effluents of undesirable chemical, higher production yield, and reduced number of apparatus and procedures. A strong need also exists for a process and apparatus that are capable of producing 2D inorganic platelets that contain mostly single-layer or few-layer structures (2-10 layers).

SUMMARY

The present disclosure provides a process for manufacturing thin 2D inorganic compound platelets, the process comprising (a) preparing a first stock containing a 3D layered inorganic compound material dispersed in a liquid medium, (b) injecting the first stock into a continuous reactor having a vortex flow, (c) operating the continuous reactor to form a reaction product suspension containing 2D inorganic compound platelets dispersed in the liquid medium, and (d) separating and recovering the 2D inorganic compound platelets from the product suspension.

Preferably, the vortex flow comprises a toroidal vortex flow. Further preferably, the toroidal vortex flow comprises a plurality of non-axisymmetric toroidal vortices. Preferably, the continuous reactor is a continuous Couette-Taylor reactor.

The inorganic layered compound may be selected from boron nitride (h-BN), $HfS_2$, tungsten disulfide ($WS_2$), $NiTe_2$, $VSe_2$, $WSe_2$, molybdenum disulfide ($MoS_2$), $MoSe_2$, $MoTe_2$, $TaS_2$, $RhTe_2$, $PdTe_2$, $NbS_2$, $NbSe_2$, $NbTe_2$, $TaSe_2$, $Bi_2Se_3$, $Bi_2Te_3$, simple hydroxides, layered double hydroxide, black phosphorus, antimonene, or a combination thereof.

In the process, the liquid medium may comprise water, alcohol, an organic solvent, or a combination thereof. The organic solvent is preferably selected from N-Methyl Pyrrolidone (NMP), Dimethylformamyde (DMF), Benzyl benzoate, γ-Butyrolactone (GBL), a surfactant, or a combination thereof.

Preferably, the product suspension is directed to flow back to the continuous director for further processing for at least another pass through the reactor. This procedure may be repeated several times (typically 1-10 times) until a desired product is achieved.

The present disclosure further provides a process for manufacturing 2D inorganic compound platelets, the process comprising: (A) injecting a first stock into a continuous reactor through a first inlet at first end of the continuous reactor having a toroidal vortex flow, wherein the first stock comprises a 3D layered inorganic compound material dispersed in a liquid medium, and the continuous flow reactor is configured to produce the toroidal vortex flow, enabling the formation of a reaction product suspension at the second end, downstream from the first end, of the continuous reactor; and (B) directing the reaction product suspension from the second end, through a flow return conduit, back to enter the continuous reactor at or near the first end, allowing the reaction product slurry to form a toroidal vortex flow and move down to or near the second end to produce a suspension of 2D inorganic compound platelets. Step (B) may be repeated for as many times as desired.

The inorganic layered compound ay be selected from boron nitride (h-BN), $HfS_2$, tungsten disulfide ($WS_2$), $NiTe_2$, $VSe_2$, $WSe_2$, molybdenum disulfide ($MoS_2$), $MoSe_2$, $MoTe_2$, $TaS_2$, $RhTe_2$, $PdTe_2$, $NbS_2$, $NbSe_2$, $NbTe_2$, $TaSe_2$, $Bi_2Se_3$, $Bi_2Te_3$, simple hydroxides, layered double hydroxide, black phosphorus, antimonene, or a combination thereof.

In some embodiments, the continuous reactor has a flow from the first inlet to the outlet, the flow being a vortex flow. Preferably, the vortex flow is a toroidal vortex flow (e.g., Taylor vortex flow).

In some embodiments, the continuous reactor is configured to produce a toroidal vortex flow. Preferably, the toroidal vortex flow comprises a plurality of non-axisymmetric (e.g., helical) toroidal vortices. Preferably, the continuous reactor is a continuous Couette-Taylor reactor.

In some embodiments, the continuous reactor comprises a reactor chamber into which the first stocks is injected; the reactor chamber being configured between an outer wall of a first cylindrical body and the inner wall of a second cylindrical body or bore, one or both of the first and second cylindrical bodies rotating around the axis thereof. In certain embodiments, the first and second cylindrical bodies are rotating in opposite directions.

In some embodiments, the liquid medium may comprise therein an intercalating agent selected from an acid, a lithium salt, a sodium salt, a potassium salt, lithium perchlorate, sodium perchlorate, potassium perchlorate, potassium manganese, lithium manganese, sodium manganese, hydrogen peroxide, a metal halide, or a combination thereof. The metal halide is preferably selected from the group consisting of $MCl_2$ (M=Zn, Ni, Cu, Mn), $MCl_3$ (M=Al, Fe, Ga), $MCl_4$ (M=Zr, Pt), and combinations thereof. The acid may be selected from sulfuric acid, nitric acid, carboxylic acid, phosphoric acid, sorbic acid, acetic acid, or a combination thereof.

The 2D inorganic compound platelets produced by the presently disclosed process typically comprises mono-layer sheets. The 2D inorganic compound platelets may comprise few-layer platelets (i.e. 2-10 compound planes, each plane containing the elements that make up the formula of a desired compound). As an example, each plane for a 2D tungsten disulfide ($WS_2$) platelet comprises elements W and S that are covalent-bonded together to form the formula $WS_2$.

The process may further comprise repeating step (B) for at least one time (e.g. 1-10 times). The process may further comprise a step of collecting the suspension of 2D platelets from all outlet of the continuous flow reactor.

The process may further comprise repeating step (13) for at least one time (e.g. another 1-10 times). The process may further comprise a step of collecting the suspension of 2D inorganic compound platelets from an outlet of the continuous flow reactor and drying the suspension to obtain 2D inorganic compound platelets in a powder form.

In the process, the liquid medium may comprise water, alcohol, an organic solvent, or a combination thereof. The organic solvent is preferably selected from N-Methyl Pyrrolidone (NMP), Dimethylformamyde (DMF), Benzyl benzoate, γ-Butyrolactone (GBL), or a combination thereof. The liquid medium may further comprise a surfactant.

The process entails subjecting reacting mass into numerous vortex flow zones having high shear stresses and shear strains therein, enabling fast, uniform, and complete intercalation and/or separation of 3D inorganic compound particles.

The present disclosure further provides a continuous reactor or reactor system for producing an inorganic 2-D compound, the reactor comprising:
a) a first body comprising an outer wall and a second body comprising an inner wall, wherein the inner wall defines a bore and the first body is configured within the bore and wherein a motor is configured to rotate the first and/or second body;
b) a reaction chamber being configured between the outer wall of the first body and the inner wall of the second body;
c) a first inlet and a second inlet disposed at or near a first end of the reactor and being configured to be in fluid communication with the reaction chamber;
d) a first outlet and a second outlet disposed downstream from the first and second inlet at or near a second end of the reactor, the first outlet and the second outlet being configured to be in fluid communication with the reaction chamber; and
e) a flow return conduit (e.g. piping means) having a first conduit inlet in fluid communication with the second outlet of the reactor and having a first conduit outlet in fluid communication with the second inlet of the reactor;
wherein the reactor or reactor system is operated to receive a first stock of reactants, containing a 3D inorganic layered compound (e.g. micron-scaled particles of $MoS_2$ or $MoSe_2$) dispersed in a liquid medium, through the first inlet into the reaction chamber, driving the reactants downstream toward the first and second outlet and facilitating reactions between the reactants to produce a first product suspension, driving the first product suspension through the flow return conduit and the second inlet of the reactor to re-enter the reaction chamber, and further driving the first product suspension downstream toward the first and second outlet to form a second product slurry, which is discharged out of the reaction chamber through the first outlet of the reactor or driven to flow through the conduit to return to the reaction chamber through the second inlet for at least another time.

The use of such a flow return conduit enables successful exfoliation and separation of 2D inorganic compound platelets using a reactor having a much shorter first body (the inner cylindrical rod). The suitable aspect ratio (rod length/diameter ratio, L/D) is typically lower than 30, often lower than 20, and most often lower than 10. Preferably, the aspect ratio is from 3 to 20 and most preferably from 5 to 15.

The reactor or reactor system typically and preferably further comprises a pump to drive the first or second product slurry through the conduit back to the reaction chamber. The reactor or reactor system may further comprise a pump configured to inject the first stock of reactants into the reaction chamber.

In certain preferred embodiments, the outer wall of the first body defines a cylindrical body. Further preferably, the inner wall of the second body defines a cylindrical bore.

The first body and/or second body may independently comprise a stainless-steel alloy (e.g., 304 stainless steel, 310M stainless steel), an austenitic stainless steel (e.g., Avesta 254 SMO), an austenitic chromium-nickel stainless steel (e.g., 316 stainless steel), a super duplex stainless steel alloy (e.g., ZERON® 100), polytetrafluoroethylene (e.g., TEFLON™), glass (e.g., borosilicate) coated metal, borosilicate glass, polytetrafluoroethylene (e.g., TEFLON™) coated metal, nickel-chromium- molybdenum-tungsten alloy (e.g., Alloy 22), stainless steel with silicon, a Ni-Fe-Cr-Mo alloy (e.g., Alloy 20, Alloy G-30, Alloy 33, Cronder 2803 Mo), a Ni-Cr-Mo alloy (e.g., Alloy C-22, Alloy-C-276, Hastelloy C-2000), an alloy (e.g., LEWMET, Hastelloy D-205, Sandvik HT 9076), lead, high silicon cast iron, cast iron (e.g., Meehanite, grey cast iron), ductile iron (e.g., MONDI), any combination thereof.

The reactor or reactor system may further comprise a cooling jacket or cooling coil in at least partial surrounding relation to the second body. The reactor or reactor system may further comprise a heating jacket or heating coil in at least partial surrounding relation to the second body. A temperature sensor and/or controller are preferably installed to regulate the reactor temperature.

The reactor or reactor system may further comprise at least a stock reservoir, the stock reservoir in fluid contact with the first inlet. The reactor or reactor system may further comprise one or more additional inlet(s), the one or more additional inlet(s) in fluid communication with the reaction chamber, and the one or more additional inlet(s) being configured in a longitudinal position between the first inlet and the first outlet.

In the reactor or reactor system, preferably the continuous reactor has a flow from the first inlet to the first outlet, the flow being a vortex flow. The vortex flow preferably is a toroidal vortex flow (e.g., Taylor vortex flow).

Preferably, the continuous reactor is configured to produce a toroidal vortex flow. The toroidal vortex flow preferably and typically comprises a plurality of non-axisymmetric (e.g., helical) toroidal vortices.

The continuous reactor is preferably a continuous Counette-Taylor reactor. The continuous reactor preferably and typically comprises a reactor chamber into which the first stock is injected; the reactor chamber being configured between an outer wall of a first cylindrical body and the inner wall of a second cylindrical body or bore, one or both of the first and second cylindrical bodies rotating around the axis thereof. In certain embodiments, the first and second cylindrical bodies are rotating pposite directions.

The present disclosure provides an apparatus or reactor system for efficiently practicing the Couette-Taylor reactor method of producing 2D inorganic compound platelets. Preferably, the reactor is in thermal contact with temperature-controlling means to regulate the temperature of the reacting slurry. The typically small gaps or the reaction chamber between two cylindrical bodies have a rotational motion relative to each other, allowing for rapid heat dissipation. In the process, temperature control means can include circulating a cooling medium around the one or a plurality of flow channels.

DETAILED DESCRIPTION OF PREFERRED EMBODIMENTS

To achieve large scale production of single-layer or few-layer 2D inorganic compound platelets, it is important to rapidly introducing an intercalating agent that fully penetrates between stacked layers and overcome the strong interlayer van der Waals forces. Complete intercalation process would give high yields of homogeneously exfoliated and separated 2D compound platelets in a reduced reaction time. Alternatively, high local shear stresses or strains must be created between a layer of compound and a neighboring layer.

Disclosed herein is a new process and apparatus to produce single-layer or few-layer 2D inorganic compound platelets from bulk (3D) inorganic compound particles with high yields in a significantly shortened reaction time. This process involves the use of a Couette-Taylor flow reactor, in which penetration of an intercalating agent or liquid medium species between layers is accelerated by the turbulent Couette-Taylor vortex flow. The disclosed process and apparatus are also capable creating local high shear stresses/strains.

Figure 1A:
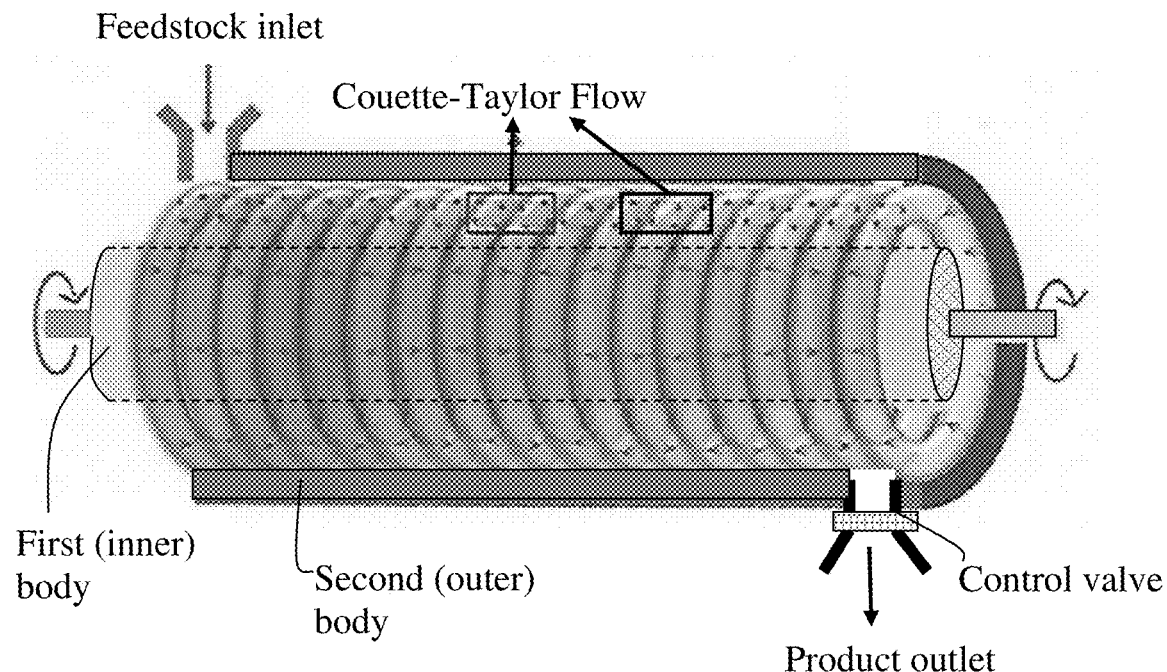
FIG. 1(A) A diagram to schematically illustrate the working principle of a Couette-Taylor reactor, without a flow return conduit.
Figure 1B:
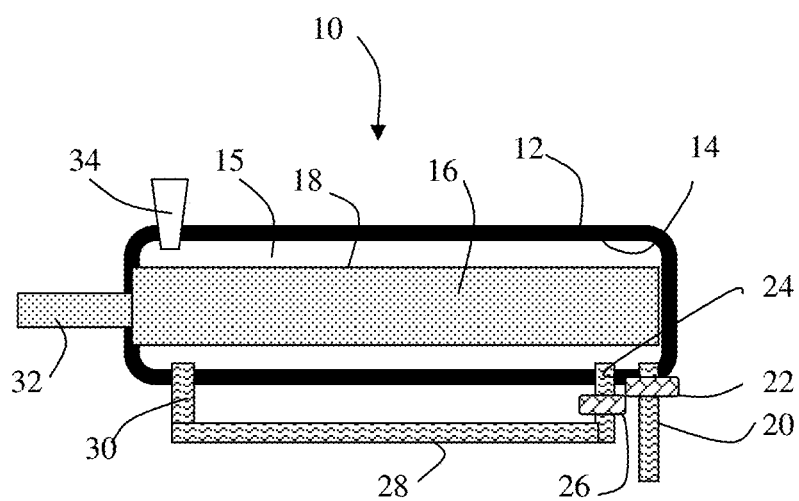
FIG. 1(B) Schematic of a new continuous reactor having a flow return conduit according to some embodiments of the instant disclosure.

As illustrated in FIG. 1(A) for a conventional Couette-Taylor reactor and FIG. 1(B) for a presently disclosed new Couette-Taylor reactor, the reactor comprises two coaxial cylinders with the inner one rotating. At a critical rotating speed, toroidal vortices are created and regularly spaced along the cylinder axis. This toroidal motion of fluids can lead to highly efficient radial mixing of 3D inorganic compound particles and an optional intercalating agent in a liquid medium in the system, thereby enhancing the exfoliation efficiency.

The current design of Couette-Taylor reactor requires a long inner cylindrical rod (referred to herein as the first body), having a high aspect ratio; the rod length/diameter ratio typically greater than 20, often greater than 50. The rotation of such a long inner rod relative to the outer annular body (the second body) means the inner rod can experience an excessively large resistance force imparted by a large amount of viscous fluid being configured to create large amounts of toroidal vortex zones. This would require the implementation of a significantly larger and more powerful electric motor, which would be heavier, more difficult to handle, and much more expensive. The operation of such a long Couette-Taylor reactor normally requires the use of a larger amount of liquid medium relative to the proportion of solid graphitic material in order for the motor to drive the inner rod at a sufficiently high speed to create the needed Taylor vortex flow.

As schematically illustrated in FIG. 1(B), in some embodiments, the presently disclosed continuous reactor 10 or reactor system for producing thin platelets of an inorganic 2-D compound typically comprise the following components: (a) a first body 16 comprising an outer wall 18 and a second body 12 comprising an inner wall 14, wherein the inner wall defines a bore and the first body is configured within the bore and wherein a motor (not shown) is configured to rotate, through a shaft 32, the first and/or second body; (b) a reaction chamber 15 being configured between the outer wall 18 of the first body and the nner wall 14 of the second body;) (c) a first inlet 34 and a second inlet 30 disposed at or near a first end of the reactor and being configured to be in fluid communication with the reaction chamber 15; (d) a first outlet 20 and a second outlet 24 disposed downstream from the first and second inlet at or near a second end of the reactor, the first outlet and the second outlet being configured to be in fluid communication with the reaction chamber 15; and (e) a flow return conduit 28 (e.g. piping means) having a first conduit inlet in fluid communication with the second outlet 24 of the reactor and having a first conduit outlet in fluid communication with the second inlet 30 of the reactor. A control valve 26 is implemented to turn on and off the second outlet 24 of the reactor on demand. Another control valve 22 is implemented to open the first outlet 20 of the reactor (for discharging the reaction product suspension out of the reactor upon completion of the needed degree of reaction, intercalation, or shearing and close the first outlet (to direct the first reaction product suspension to flow through the second outlet 24 into the flow return conduit 28 for additional processing) on demand.

In such a design, the reactor or reactor system is operated to receive a first stock of reactants, containing an inorganic layered compound dispersed in a liquid medium, through the first inlet 34 into the reaction chamber 15, driving the reactants downstream toward the first 20 and second outlet 24 and facilitating shearing and/or intercalation to produce a first product suspension, driving the first product suspension through the flow return conduit 28 and the second inlet 30 of the reactor to re-enter the reaction chamber 15, and further driving the first product suspension downstream toward the first 20 and second outlet 24 to form a second product suspension, which is either discharged out of the reaction chamber through the first outlet 20 of the reactor (where the control valve 22 being open) or driven to flow through the conduit 28 to return to the reaction chamber 15 through the second inlet 30 for at least another time. Such a design enables the use of a much shorter reactor since the reaction product suspension, if containing un-reacted, un-exfoliated or incompletely exfoliated species, may be returned to the reaction chamber for a desired number of times (e.g. repeated for another 1-10 times) until a desired final product is obtained. Even for a long reactor, this return flow conduit strategy enables the completion of desired exfoliation and separation of inorganic compound platelets in a convenient and cost-effective manner.

As compared to conventional methods of 2D crystal production, the presently disclosed reactor system allows for the production of mostly single-layer or few-layer 2D inorganic compound platelets at a high yield within an hour of reaction time.

To enable the efficient oxidation of inorganic compounds, it would be important to enhance the rate of diffusion of an intercalating agent or liquid medium species into the interlayer and/or create local high shear stresses/strains. For this purpose, a new Couette-Taylor flow reactor is used for the efficient mixing and mass transfer of all reactants thereby enhancing the efficiency and rate of exfoliation and separation.

The intercalating agent may be selected from an acid, a lithium salt, a sodium salt, a potassium salt, lithium perchlorate, sodium perchlorate, potassium perchlorate, potassium manganese, lithium manganese, sodium manganese, hydrogen peroxide, a metal halide, or a combination thereof. The metal halide is preferably selected from the group consisting of $MCl_2$ (M=Zn, Ni, Cu, Mn), $MCl_3$ (M=Al, Fe, Ga), $MCl$, (M=Zr, Pt), and combinations thereof. The acid may be selected from sulfuric acid, nitric acid, carboxylic acid, phosphoric acid, sorbic acid, acetic acid, or a combination thereof.

As shown in FIG. 1(A) and FIG. 1(B), the Couette-Taylor reactor consists of two concentric cylinders and the inner cylinder rotates at a controlled speed while the outer cylinder is maintained stationary. A mixture of reactants (3D inorganic compound powder particles, optional intercalating agent, surfactant, and liquid medium) was fed into the reactor. As the rotation speed of the inner cylinder reaches a critical value, it develops the counter-rotating toroidal vortices in a periodic arrangement along the cylinder axis. This Couette-Taylor vortex induces highly effective radial mixing within each vortex cell and uniform fluidic motion, enabling enhanced mass transfer of the reactants. This toroidal motion also causes a high wall shear stress that improves the dispersion of inorganic compound in a liquid medium, shearing one compound layer over another layer and enhances the rate of diffusion of the intercalating agent, surfactant, and/or liquid species into the inter-graphene spacing of a graphite structure.

In a Couette-Taylor reactor, the hydrodynamic condition of the fluids is dependent on the rotating speed of the inner cylinder relative to the outer cylinder. The Couette-Taylor vortex can be formed when the Taylor number proportional to the angular velocity of the inner cylinder exceeds a critical value. Our studies indicate that the threshold rotation speed is typically from 300 to 600 rpm for the formation of Couette-Taylor vortex that can lead to the efficient oxidation reaction of 3D layered inorganic compounds. In a shearing stress reactor, including the Couette-Taylor reactor, the hydrodynamic condition of the fluids depends on the rotating speed of the inner cylinder. The shearing stress flow is formed when the Taylor number (Ta) proportional to the angular velocity of the inner cylinder exceeds a critical value, which is determined by the following relation:

$$Ta = \left(\frac{d}{R_1}\right)^{1/2} \frac{\omega_1 R_1 d}{v} \qquad \text{(Equation 1)}$$

where $R_1$ is the radius of inner cylinder, $\omega_1$ is the angular velocity of the inner cylinder, d is the width of the annular gap (herein also referred to as the reaction chamber), and v is the kinematic viscosity. The viscosity of the reaction mass was found to be typically from 300 to 2,000 cP. The shearing stress increases with rotational speed, resulting in more efficient exfoliation of layered inorganic compounds at higher shear force. We have further observed there is no problem of pumping the reaction product suspension back to the reaction chamber through the flow return conduit.

The disclosed process and apparatus are also capable of exfoliating layered inorganic compounds in a non-oxidizing liquid medium to produce 2D inorganic compound platelets. In principle, one can divide the reactants in the reaction chamber into a large number of small Taylor vortex zones. These small Taylor vortices of reactants are each a minute high-shear reactor, capable of exfoliating substantially any type of layered materials.

The process may further comprise repeating step (B) for at least one time (e.g. another 1-10 times). The process may further comprise a step of collecting the suspension from an outlet of the continuous flow reactor and then drying the suspension to obtain 2D inorganic compound platelets.

The process may further comprise separation of the inorganic compound platelets from the suspension conducted by filtration, centrifugation, spray-drying, heat-assisted liquid vaporization, etc.

In the process, the liquid medium may comprise water, alcohol, an organic solvent, or a combination thereof. The organic solvent is preferably selected from N-Methyl Pyrrolidone (NMP), Dimethylformamyde (DMF), Benzyl benzoate, γ-Butyrolactone (GBL), or a combination thereof. The liquid medium may further comprise a surfactant.

The process entails subjecting reacting mass into numerous vortex flow zones having high shear stresses and shear strains therein, enabling fast, uniform, and complete exfoliation of layered inorganic compound particles. Typically and preferably, the invented method leads to the production of 2D) inorganic compound platelets that contain at least 80% single-layer platelets or at least 80% few-layer platelets (defined as 2D inorganic compound platelets having 2-10 planes, each plane containing the elements that make up the formula of a desired compound).

The following examples serve to provide the best modes of practice for the present disclosure and should not be construed as limiting the scope of the disclosure:

EXAMPLE 1: Production of Molybdenum Diselenide Nano Platelets

A new Couette-Taylor reactor (inner cylinder having a diameter of approximately 18 cm and a length of about 85 cm) designed according to an embodiment of the present disclosure was used to exfoliate a broad array of layered inorganic compounds. The process involved dispersing a layered compound in a liquid medium (water or water mixed with ethanol) and passing the reactants and a resulting product suspension through the Couette-Taylor reactor three times. As an example, dichalcogenides, such as $MoS_2$, produced in this manner have found applications as electrodes in lithium ion batteries and as hydro-desulfurization catalysts.

For instance, $MoSe_2$ consisting of Se—Mo—Se layers held together by weak van der Waals forces can be exfoliated via the presently invented process. Intercalation can be achieved by dispersing $MoSe_2$ powder in a silicon oil beaker, with the resulting suspension subjected injected into the first inlet of the reactor, which was operated with 650 RPM for 25 minutes per pass. The resulting $MoSe_2$ platelets were found to have a thickness in the range from approximately 1.4 nm to 13.5 nm with most of the platelets being mono-layers or double layers.

Other single-layer platelets of the form $MX_2$ (transition metal dichalcogenide), including $MoS_2$, $TaS_2$, and $WS_2$, were similarly exfoliated. In particular, the inorganic layered compound is selected from boron nitride (h-BN), $HfS_2$, tungsten disulfide ($WS_2$), $NiTe_2$, $VSe_2$, $WSe2$, molybdenum disulfide ($MoS_2$), $MoSe_2$, $MoTe_2$, $TaS_2$, $RhTe_2$, $PdTe_2$, $NbS_2$, $NbSe_2$, $NbTe_2$, $TaSe_2$, $Bi_2Se_3$, and $Bi_2Te_3$. Again, most of the platelets were mono-layers or double layers after subjecting the layered inorganic compound through the new Couette-Taylor reactor for 2-5 passes. This observation clearly demonstrates the versatility of the presently invented process and reactor system in terms of producing relatively uniform-thickness platelets that are ultra-thin.

EXAMPLE 2: Production of Tungsten Disulfide Nano Platelets

Bulk tungsten disulfide ($WS_2$, 6 μm, 99.0%) was used in the study. A certain amount of $(NH_4)_2CO_3$ was dissolved in 100 mL deionized water, and then dropwise added into bulk $WS_2$ until saturation. Subsequently, the resulting mixture was further added with a mixture of DMSO and deionized water with the molar proportion of 1:1 to obtain a $WS_2$ suspension. The suspension was then allowed to run through the reaction chamber of the same Couette-Taylor reactor for 3 passes. The exfoliated nano-sheets or platelets were found to have from mono layer to five layers.

EXAMPLE 3: Production of Layered Double Hydroxide Platelets

Layered double hydroxide (LDH) are a class of ionic layered materials which display a brucite-like structure with the general formula $[M^{II}_{1-x}M^{III}_x(OH)_2]^{x+}(A^{n-})_{x/n} \cdot mH_2O$. The main structure of a LDH contains the cationic hydroxide sheets and the presence of the interlayer anions compensating the excess of positive charge. In addition, solvent molecules surround the structure. A key attribute of these materials is their ability to replace the interlayer anion using anion exchange reactions.

LDHs were obtained with carbonate ($CO_3^{2-}$) in the interlayer space due to the higher affinity with respect to other anions. Highly crystalline CoAl-$CO_3$ sample was synthesized following the method described by Liu et al. (Z. Liu, R. Ma, M. Osada, N. Iyi, Y. Ebina, K. Takada and T. Sasaki, J. Am. Chem. Soc., 2006, 128, 4872-4880) using urea as an ammonia-releasing reagent to achieve a hexagonal morphology. The dodecyl-intercalated CoAl-DS sample was obtained after two successive anion exchange reactions, first to nitrate using the acid-salt approach and afterwards to dodecyl sulfate. The synthesis of the LDH phase was confirmed by X-ray powder diffraction, exhibiting the main basal reflections for hydrotalcite-like materials. The main (003) peak is related to the basal space of the LDH material, therefore shifting towards lower 2Θ values as the length of the intercalated anion increases. The basal spaces for the CoAl-$CO_3$ and CoAl-DS samples were found to be 0.76 nm and 2.67 nm, respectively.

For exfoliation of these LDH compound in the Couette-Taylor reactor, N-Cyclohexyl-2-pyrrolidone (CHP) and the 1-Pentanol were used as a liquid medium for the CoAl-$CO_3$ and CoAl-DS samples, respectively. Upon completion of the resulting suspensions for 4 passes, 2D nano platelets having a thickness from 3-10 nm were obtained.

EXAMPLE 4: Production of Layered Metal Diboride

Borophene, a 2D material containing planar boron, has recently been shown to possess exceptional electronic properties and outstanding mechanical properties. However, the challenge in synthesis and the environmental instability of borophene limit its use outside the laboratory. Here we demonstrate the production of a new class of boron-based 2D materials, the metal diborides, which contain planar hexagonal boron sheets analogous to graphene separated by metal atoms, through Couette-Taylor exfoliation of bulk metal diborides.

Liquid suspensions containing high-concentration of two-dimensional boron sheets in both aqueous solutions and organic solvents were produced. The starting 3D layered compounds for these two-dimensional sheets are inexpensive powders of the family of boron-rich materials known as metal diborides. They have the common chemical formula MB2, where M is a metal. Metal diborides possess a layered structure containing hexagonal sheets of boron with metal atoms sandwiched between them.

Few-layer metal diboride sheets in a variety of solvents and aqueous surfactant solutions were prepared using the presently disclosed Couette-Taylor reactor. After allowing the reactants and product suspension to flow back to the reactor and pass through the rector for 1-3 times, the diboride sheets are mostly few-layer platelets. The Couette-Taylor reactor relies on the principle of high-shear stresses/strains in a vortex flow (e.g. toroidal vortex flow comprising a plurality of non-axisymmetric toroidal vortices) to shear apart the sheets, which are then stabilized by the surrounding solvent or surfactant molecules. As an example, the process involved 40 g of bulk metal diboride powder in 600 mL of each solvent or surfactant solution. For providing a liquid suspension, dimethylformamide (DMF) was found to be an effective solvent for MgB2 and $AlB_2$, while N-methyl-2-pyrrolidone (NMP) was effective for $HfB_2$ and $TaB_2$. $TiB_2$ and $CrB_2$ were efficiently dispersed in aqueous solution using the anionic surfactant sodium cholate (SC) and $ZrB_2$ and $NbB_2$ were best exfoliated in aqueous solution using the cationic surfactant myristyltrimethylammonium bromide (MTAB).

Following 3-5 passes through a Couette-Taylor reactor, the supernatant was decanted. This process was applied to several different metal diborides: magnesium diboride ($MgB_2$), aluminum diboride ($AlB_2$), titanium diboride ($TiB_2$), chromium diboride ($CrB_2$), zirconium diboride ($Z_rB_2$), niobium diboride ($NbB_2$), hafnium diboride ($HfB_2$), and tantalum diboride (TaB$_2$). The resulting solution-phase dispersions were grey to dark black depending on the metal diboride type.

The invention claimed is:

1. A process for manufacturing 2D inorganic compound platelets, the process comprising (a) preparing a first stock containing a 3D layered inorganic compound material dispersed in a liquid medium, (b) injecting said first stock into a continuous reactor having a vortex flow, (c) operating said continuous reactor to form a reaction product suspension containing 2D inorganic compound platelets dispersed in said liquid medium, and (d) separatimg and recovering said 2D inorganic compound platelets from said product suspension; wherein the vortex flow comprises a toroidal vortex flow.

2. The process of claim 1, wherein the toroidal vortex flow comprises a plurality of non-axisymmetric toroidal vortices.

3. The process of claim 1, wherein the continuous reactor is a continuous Couette-Taylor reactor.

4. The process of claim 1, wherein the inorganic layered compound is selected from boron nitride (h-BN), HfS$_2$, tungsten disulfide (WS$_2$), NiTe$_2$, VSe$_2$, WSe2, molybdenum disulfide (MoS$_2$), MoSe$_2$, MoTe$_2$, TaS$_2$, RhTe$_2$, PdTe$_2$, NbS$_2$, NbSe$_2$, NbTe$_2$, TaSe$_2$, Bi$_2$Se$_3$, Bi$_2$Te$_3$, simple hydroxides, layered double hydroxide, black phosphorus, antimonene, or a combination thereof.

5. The process of claim 1, wherein the 2D inorganic compound platelets comprise mono-layer platelets.

6. The process of claim 1, wherein the 2D inorganic compound platelets comprise few-layer platelets having 2-10 unit planes.

7. The process of claim 1, wherein said liquid medium comprises, water, alcohol, an organic solvent, or a combination thereof.

8. The process of claim 7, wherein said organic solvent is selected from N-Methyl Pyrrolidone (NMP), Dimethylformamyde (DMF), Benzyl benzoate, γ-Butyrolactone (GBL), a surfactant, or a combination thereof.

9. The process of claim 1, wherein said liquid medium further comprises a surfactant.

10. The process of claim 1, further comprising implementing a cooling jacket or cooling coil and/or a heatimg jacket or heating coil in at least partial surrounding relation to the second body to regulate a temperature of the continuous reactor.

11. A process for manufacturing 2D inorganic compound platelets, the process comprising (a) preparing a first stock containing a 3D layered inorganic compound material dispersed in a liquid medium (b) injecting said first stock into a continuous reactor having a vortex flow, (c) operating said continuous reactor to form a reaction product suspension containing 2D inorganic compound platelets dispersed in said liquid medium, and (d) separating and recovering said 2D inorganic compound platelets from said product suspension; wherein the product suspension is directed to flow back to the continuous director for further processing for at least another pass through the reactor.

12. A process for manufacturing 2D inorganic compound platelets, the process comprising;
A) injecting a first stock into a continuous reactor through a first inlet at first end of said continuous reactor having a vortex flow, wherein the first stock comprises a 3D layered inorganic compound material and a liquid medium, and the continuous flow reactor is configured to produce said toroidal vortex flow, enabling the formation of a reaction product suspension at the second end, downstream from the first end, of said continuous reactor; and)
B) directing said reaction product suspension from said second end, through a flow return conduit, back to enter said continuous reactor at or near said first end, allowing said reaction product slurry to form a toroidal vortex flow and move down to or near said second end to produce a suspension of 2D inorganic compound platelets.

13. The process of claim 12, wherein the continuous reactor has a flow from the first inlet to the outlet, the flow being a vortex flow.

14. The process of claim 13, wherein the vortex flow is a toroidal vortex flow.

15. The process of claim 12, wherein the continuous reactor is configured to produce a toroidal vortex flow.

16. The process of claim 15, wherein the toroidal vortex flow comprises a plurality of non-axisymmetric toroidal vortices.

17. The process of claim 12, wherein the continuous reactor is a continuous Couette-Taylor reactor.

18. The process of claim 12, wherein the continuous reactor comprises a reactor chamber into which the first stock is injected; the reactor chamber being configured between an outer wall of a first cylindrical body and the inner wall of a second cylindrical body or bore, one or both of the first and second cylindrical bodies rotating around the axis thereof.

19. The process of claim 18, wherein the firstand second cylindricalodies are rotating in opposite directions.

20. The process of claim 12, further comprising repeating said step (B) for at least one time.

21. The process of claim 12, further comprising a step of collecting said suspension of 2D inorganic compound platelets from an outlet of the continuous flow reactor.

22. The process of claim 12, further comprising a step of removing the inorganic compound platelets from the suspension.

* * * * *